(12) United States Patent
Doerr (10) Patent No.: US 10,831,044 B1
(45) Date of Patent: Nov. 10, 2020

(54) TRAVELING WAVE MODULATOR

(71) Applicant: Acacia Communications, Inc., Maynard, MA (US)

(72) Inventor: Christopher Doerr, Middletown, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 16/590,630

(22) Filed: Oct. 2, 2019

Related U.S. Application Data (63) Continuation of application No. 15/913,751, filed on Mar. 6, 2018, now Pat. No. 10,488,683.

(60) Provisional application No. 62/467,788, filed on Mar. 6, 2017.

(51) Int. Cl.
| | |
|---|---|
| *G02F 1/025* | (2006.01) |
| *G02F 1/01* | (2006.01) |
| *G02F 1/225* | (2006.01) |
| *G02F 1/015* | (2006.01) |
| *G02F 1/21* | (2006.01) |

(52) U.S. Cl.
CPC ............ *G02F 1/025* (2013.01); *G02F 1/0123* (2013.01); *G02F 1/2255* (2013.01); *G02F 1/2257* (2013.01); *G02F 2001/0151* (2013.01); *G02F 2001/212* (2013.01)

(58) Field of Classification Search
None
See application file for complete search history.

(56) References Cited

U.S. PATENT DOCUMENTS

| | | | |
|---|---|---|---|
| 9,454,059 B1* | 9/2016 | Nagarajan | G02F 1/025 |
| 2002/0071622 A1* | 6/2002 | Betts | G02F 1/2257 |
| | | | 385/2 |
| 2013/0343693 A1 | 12/2013 | Doerr | |
| 2015/0036965 A1* | 2/2015 | Prosyk | G02F 1/2255 |
| | | | 385/3 |
| 2016/0363835 A1* | 12/2016 | Nagarajan | G02F 1/0121 |
| 2019/0094648 A1* | 3/2019 | Williams | G02F 1/2255 |
| 2020/0064707 A1* | 2/2020 | Vitic | G02F 1/2257 |
| 2020/0081314 A1* | 3/2020 | Parvizi | G02F 1/2255 |
| 2020/0124878 A1* | 4/2020 | Yu | H01L 27/30 |

* cited by examiner

*Primary Examiner* — Jerry Rahll
(74) *Attorney, Agent, or Firm* — Joseph D'Angelo (57) ABSTRACT

In an embodiment, a method and apparatus for increasing bandwidth of an optical modulator by applying a first voltage applied to a beginning of a resistive line and applying a second voltage applied to an end of the resistive line; wherein the first voltage is less than the second voltage.

14 Claims, 7 Drawing Sheets

TRAVELING WAVE MODULATOR

RELATED APPLICATIONS

The present application is a Continuation application of U.S. patent application Ser. No. 15/913,751, filed Mar. 6, 2018 entitled "TRAVELING WAVE MODULATOR," which claims the benefit under 35 U.S.C. § 119(e) of U.S. Patent Application Ser. No. 62/467,788, filed Mar. 6, 2017 entitled "TRAVELING-WAVE OPTICAL MODULATORS WITH VARYING IMPEDANCE," both of which are hereby incorporated herein by reference in their entireties.

BACKGROUND

Optical transmission of information over a fiber optic cable encodes the information on a light wave.

BRIEF DESCRIPTION OF THE FIGURES

Various aspects and embodiments of the application will be described with reference to the following example embodiments. It should be appreciated that the figures are not necessarily drawn to scale.

SUMMARY

In an embodiment, a method and apparatus for increasing bandwidth of an optical modulator by applying a first voltage applied to a beginning of a resistive line and applying a second voltage applied to an end of the resistive line; wherein the first voltage is less than the second voltage.

DETAILED DESCRIPTION

Generally, an optical wave modulator encodes information by applying a waveform to modulate a light wave. Typically, a wave modulator may include a mach-zehnder interferometer, which may be a two armed interferometer. Conventionally, an optical wave modulator may split light into two waveguides, modulate the light in each waveguide, then recombine the light into a single waveguide. Usually, a light wave may be modulated by using an electrical field.

In some embodiments, a waveguide of a modulator may be silicon, which transitions to p and n doped regions. In most embodiments, applying a field across a p-n junction or p and n doped regions of a waveguide may enable modulation of light. In many embodiments, applying a field across a p-n junction may change a depletion width of a waveguide through a reverse bias. In most embodiments, applying more voltage may make a depletion width wider, which may result in a change in the amount of electrons and holes in the waveguide. In many embodiments, changing the amount of electrons and holes in a waveguide may change a refractive index of the waveguide.

In most embodiments, each waveguide of a modulator may be modulated in a push-pull fashion. In many embodiments, push pull may describe a positive voltage change in a first waveguide and a negative voltage change in a second waveguide. In some embodiments, push pull may describe an increase of one depletion width and a decrease of another depletion width. In most embodiments, as a light wave travels down a modulator an electric field may launch from a left side of the modulator and may travel down the transmission line. In most embodiments, an electrical wave and optical wave of a modulator may have the same speed. In most embodiments, at the end of an electrical line there may be a resistor to terminate an electrical field generated by the electrical line. In some embodiments, if an electrical field is not terminated, it may reflect back and cause problems.

Conventionally, today's modulators are limited in their bandwidth or the ability to modulate the light. Typically, the faster the modulation is pushed, the more the electric field is dissipated. Generally, high frequencies may not survive down a modulator very far. Usually, low frequencies may survive at an end of a modulator but high frequencies are of significant value only at a beginning of a modulator.

In certain embodiments, it may be helpful to understand how a modulator functions using a model or level of abstraction. In many embodiments, it may be helpful to design a modulator by using a model of the modulator. In many embodiments, part of a modulator may be modeled as two waveguides running through a set of diodes.

In many embodiments, a waveguide and ability to encode data may be modeled using diodes, which may represent part of a modulator. In some embodiments, the number of segments of diodes used in the model may be large in order to accurately model a modulator, where a modulator may actually represent a contiguous portion of doped p-n junction. In further embodiments, each diode of a set of diodes may be modeled as an electric circuit. In many embodiments, each electric circuit may contain one or more inductors, resistors, and capacitors. In some embodiments, using a set of inductors, resistors, and capacitors to model a modulator, respective values of each of the inductors, resistors, and capacitors may be the same.

In some embodiments, a model of a modulator may include an arrangement of inductors of inductance L and resistors of resistance RL interleaved with an arrangement of capacitors of capacitance C and resistors of resistance RC. In certain embodiments, an arrangement of some inductors and resistors may be in series. In many embodiments, some resistors and capacitors may be in a parallel arrangement. In some embodiments, arrangements of inductors and resistors and capacitors and resistors may be repeated multiple times to model a modulator. In most embodiments, a modulator may terminate with a resistor of a given capacitance. In many embodiments, multiple sets of inductors, capacitors, and resistors, arranged as a set of circuits may be used to model the behavior of a modulator, where the modulator may be continuous.

The current disclosure realizes that, in many embodiments, the bandwidth of a modulator may be limited as an electrical signal used to produce the modulation may become attenuated as it travels down the modulator. The current disclosure, in some embodiments, realizes that bandwidth limitations of a traveling-wave silicon photonic modulator may be result of dissipation of current in the capacitor feed resistance, $R_C$, as the RF wave feeds capacitors. In many embodiments, the current disclosure realizes that higher frequencies charge and discharge the capacitors more often and thus may suffer higher attenuation as the current passes through the resistors in and out of the capacitors. In many embodiments, a higher $R_C$ and/or a higher C may result in higher attenuation. In certain embodiments, the current disclosure realizes that there may be tradeoffs between having a lower the $R_C$, the higher the doping in the silicon and thus the higher the optical loss; and the lower the C often the weaker the modulation efficiency.

In other embodiments, the current disclosure realizes that it may be possible to improve the performance of a modulator by varying values of one or more inductors, resistors, and capacitors that may make up a model of the modulator. In many embodiments, a model that increases bandwidth may be implemented in a physical modulator. In certain embodiments, varying an impedance may offset attenuations, which may increase bandwidth of a modulator. In other embodiments, varying a capacitance may increase bandwidth in a modulator. In some embodiments, an optical modulator may have performance of 25-30 GHz.

In further embodiments, varying resistance along a waveguide may increase the bandwidth of a modulator. In some embodiments, increasing capacitance running along a waveguide may increase the bandwidth of a modulator. In many embodiments, increasing resistance along a waveguide of a modulator may increase the bandwidth of the modulator. In certain embodiments, increasing resistance and capacitance along a waveguide of a modulator may increase the bandwidth of the modulator. In some embodiments, bandwidth of a modulator may be increased by lowering electrical loss for high frequencies at the beginning of the modulator. In certain embodiments, efficiency at a beginning of a modulator may be traded for increased bandwidth.

In some embodiments, by having $R_C$ and C start small and then increase along the modulator, lower high-frequency loss at the beginning of the modulator and high high-frequency loss at the end of the modulator may be obtained. In certain embodiments, a same total high-frequency loss may be experienced while larger net modulation at frequencies may be provided. In many embodiments, higher modulation bandwidth may be obtained without sacrificing the total optical loss and the total modulation efficiency.

In many embodiments, a change in impedance may be achieved by varying the capacitance of a traveling-wave optical modulator. In certain embodiments, a change in capacitance may be achieved by varying the doping concentration of a phase shifter (e.g., a p-n-junction). In other embodiments, a change in capacitance may be achieved by varying a size of a phase shifter (e.g., a p-n-junction). In further embodiments, a change in capacitance may be achieved by varying bias voltage along the modulator. In some embodiments, a change in impedance may be achieved by varying the resistance of a traveling-wave optical modulator. In certain embodiments, a change in resistance may be achieved by varying the doping concentration in a waveguide. In some embodiments, a change in resistance may be achieved by moving a doped region closer to or away from the optical wave guided by the optical waveguide.

In many embodiments, moving the doping further from the optical wave may increase the resistance. In some embodiments, an optical modulator may be created by locating a doped region of the waveguide closer to the guided optical wave by 0.1 to 1.0 microns. In certain embodiments, in addition to a pn doping there may be a P+ and N+ doping in a waveguide. In certain embodiments, P+ and N+ doping may be at the edge of a waveguide. In some embodiments, a waveguide may be 0.5 microns in width. In some embodiments, P++ and or N++ doping may be at 0.4 microns. In certain embodiments, P++ and/or N++ doping may be varied from 0.1 to 0.8 microns. In some embodiments, metal lines, such as conductive metal lines may be 20 microns wide. In certain embodiments, metal lines, such as conductive metal lines may be separated by a 15 micron gap. In many embodiments, the width of a metal line may be varied to between 10-15 microns. In some embodiments, the gap of metal lines may be varied to between 15-30 microns.

In some embodiments, there may be multiple ways to increase C and $R_C$ along a modulator. In a particular embodiments, capacitance C may be increased by increasing doping in the center of a waveguide. In some embodiments, the higher the doping the smaller the depletion region may be, the higher the capacitance may be. In certain embodiments, capacitance C may be increased by changing the modulator bias along the modulator. In some embodiments, a bias voltage may be higher at the beginning of the modulator than at the end of a modulator to increase bandwidth. In some embodiments, $R_C$ may be increased by decreasing and/or moving away the doping in or near the waveguide to increase bandwidth. In certain embodiments, to decrease the doping, multiple segments may be used to increase bandwidth.

In some embodiments, a modulator's inductance may be varied along the modulator's length. In many embodiments, inductance may be larger at the beginning of a modulator and may be decreased toward the end of the modulator. In certain embodiments, inductance may be increased by increasing a gap between metal lines and/or by narrowing a width of the metal lines. In most embodiments, variations in inductance may result in variations in impedance.

In many embodiment, bandwidth of a modulator may be increased by using a modulator that has less electrical loss at the beginning of the modulator than occurs at the end of the modulator for high frequencies. In some embodiments, a different bias voltage may be used at the beginning and the end of a modulator. In most embodiments, a higher bias voltage may be used at the beginning of a modulator than at the end of a modulator. In certain embodiments, there may be a tradeoff between higher optical power loss and higher modulation or more bandwidth. In some embodiments, varying impedance may be used to increase bandwidth in a silicon photonic modulator. In other embodiments, varying impedance may be used in other types of optical modulators. In further embodiments, varying impedance may be used in an indium phosphide optical modulator. In some embodiments, techniques of the current disclosure may be with other traveling-wave modulator designs, such as capacitive loaded traveling-wave modulators.

Figure 1:
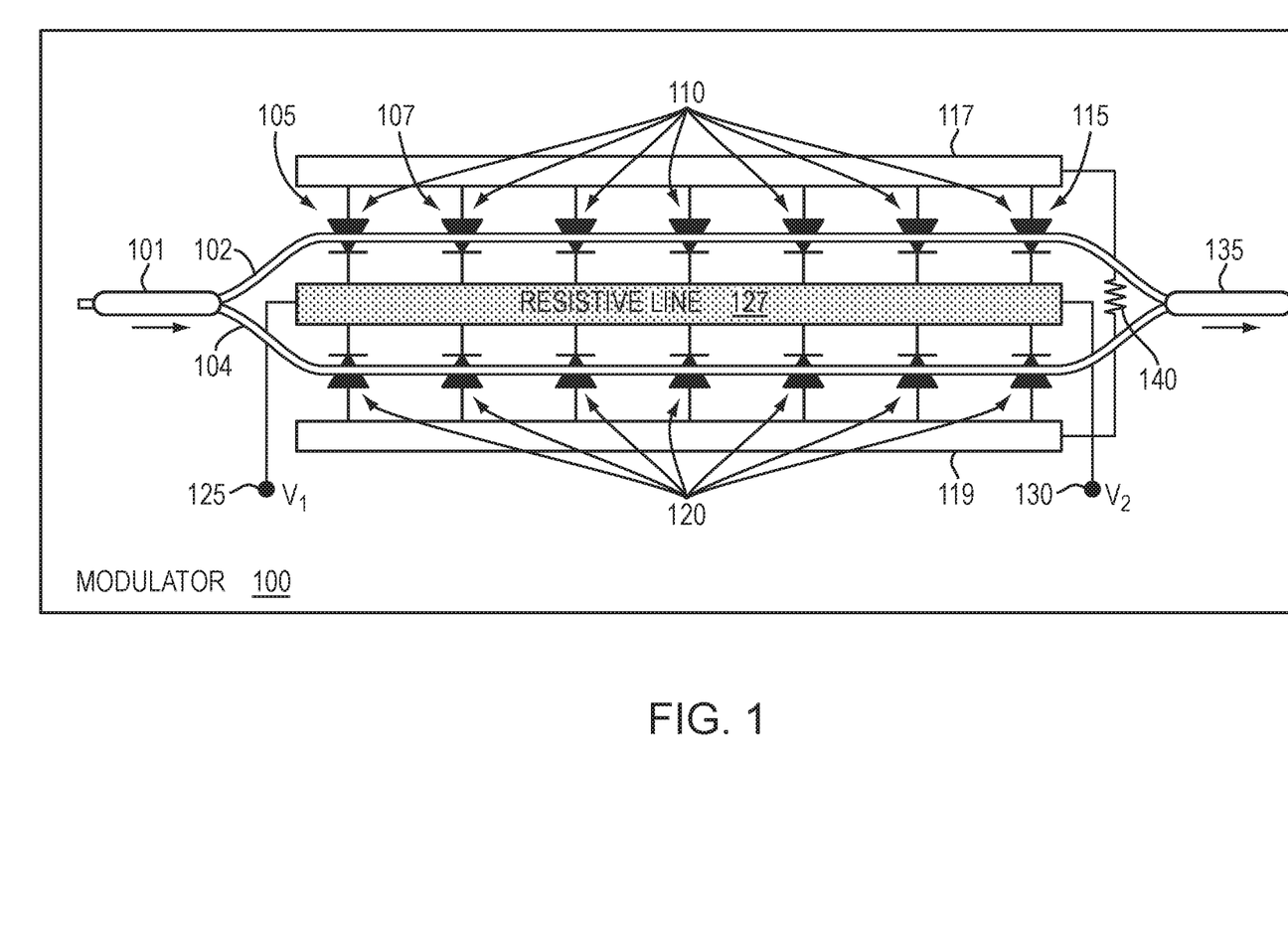
FIG. 1 is a simplified illustration of a model of a modulator, in accordance with an embodiment of the present disclosure.

Refer now to the example embodiment of FIG. 1, which illustrates a modulator in accordance with an embodiment of the current disclosure. In this embodiment, splitter 101 splits the light into waveguide 102 and 104. Waveguide 102 passes through diodes 110 and waveguide 104 passes through diodes 120. Waveguides 102 and 104 recombine at coupler 135. Resistive line 127 passes between and connects diodes 110 and diodes 120 and serves as an input for bias voltage V1 125 and voltage V2 130. Line 117 connects to diodes 110 and line 119 connects to diodes 120. Lines 117 and 119 are connected with resistor 140, which is used to terminate an electric field in the modulator. Modulator 100 modulates light by applying bias voltages V1 125 and V2 130 through resistive line 127. As light travels through waveguides 102 and 104, the bias voltages cause an electrical field to occur in Modulator 100 modulating the light in waveguides 102 and 104.

Figure 2:
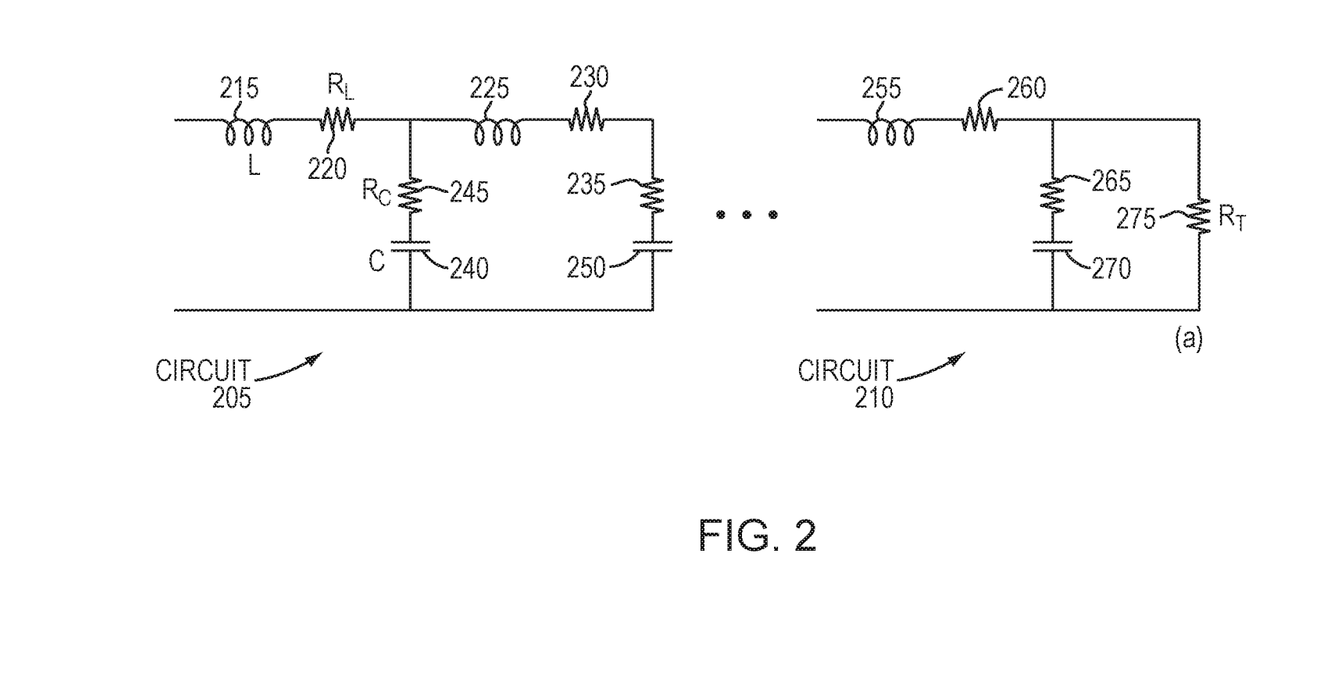
FIG. 2 is an illustration of a model of a portion of a modulator expressed as a circuit diagram, in accordance with an embodiment of the present disclosure.

Refer now as well to the example embodiment of FIG. 2, which represents an example model of the diodes 110 of modulator 100. In this example embodiment, circuit 205 corresponds to diodes 105 and 107 of Modulator 100 and circuit 110 corresponds to diode 115 of Modulator 100. The ellipse between circuit 205 and 210 represents the other diodes of diodes 110 of modulator 100; although not shown in FIG. 2 would represent the same or similar circuits. Circuit 205 has inductor 215 in series with resistor 81220 which is in series with inductor 225 and resistor 230. Capacitor 240 and resistor Rc 245 are in parallel with inductor 215 and with resistor 235 and inductor 250. Circuit 210 has inductor 255 and resistor 260 in parallel with resistor 265 and capacitor 270. Terminal resistor RT 275 corresponds to resistor 140 in modulator 100 and is used to terminate an electrical field. In the embodiment of FIG. 2, each of inductors 215, 225, and 255 have the same value. Each of resistors 220, 235, 245, 260 and 265 have the same values. As well, capacitors 240, 250, and 270 also have the same value. A modulator represented by circuits 205 and 210 has a constant impedance along it length. As well, turning back to FIG. 1, diodes 120 may also be represented by a set of circuits such as those shown in FIG. 2.

Figure 3:
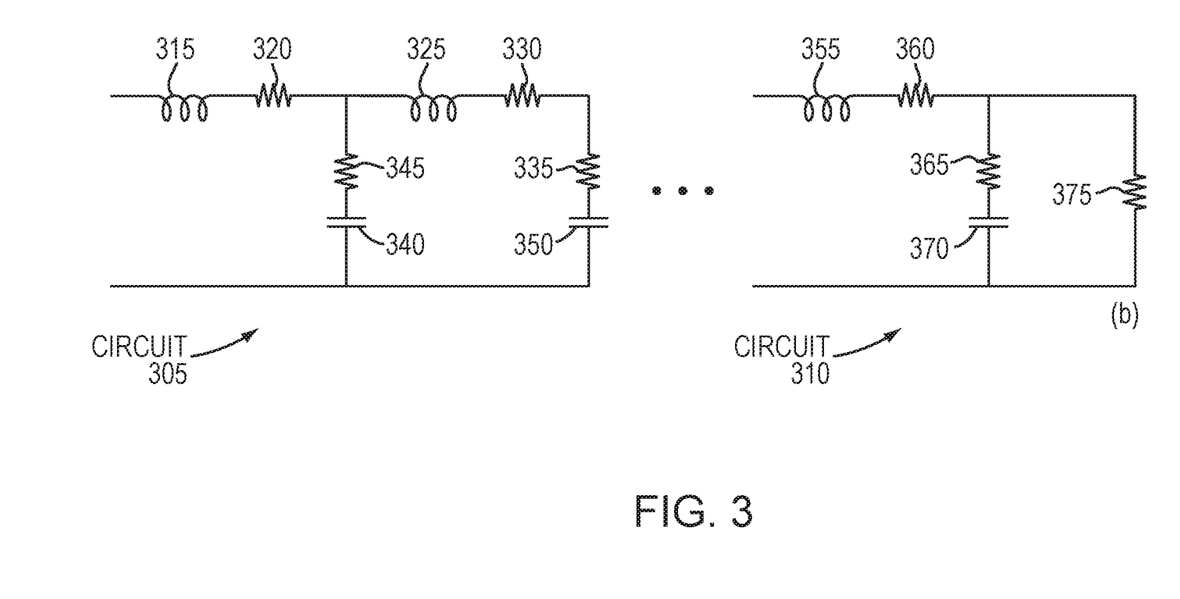
FIG. 3 is an alternative illustration of a model of a portion of a modulator expressed as a circuit diagram with increasing capacitance, in accordance with an embodiment of the present disclosure.

Refer now to the example embodiments of FIGS. 1 and 3, where FIG. 3 represents an alternative model of the diodes 110 of modulator 100. In this example embodiment, circuit 305 corresponds to diodes 105 and 107 of Modulator 100 and circuit 310 corresponds to diode 115 of Modulator 100. The ellipse between circuit 305 and 310 represents the other diodes of diodes 110 of modulator 100. In this embodiment, for additional circuits between Circuit 305 and 310 the capacitor in parallel for each additional circuit would have an increasing capacitance between the capacitance of capacitor 350 and capacitor 370. Circuit 305 has inductor 315 in series with resistor Rl 320 which is in series with inductor 325 and resistor 330. Capacitor 340 and resistor Rc 345 are in parallel with inductor 315 and with resistor 335 and inductor 350. Circuit 310 has inductor 355 and resistor 360 in parallel with resistor 365 and capacitor 370. Terminal resistor RT 375 corresponds to resistor 140 in modulator 100.

In the embodiment of FIG. 3, each of inductors 315, 325, and 355 have the same value. Each of resistors 320, 335, 345, 360 and 365 have the same values. In the example embodiment of FIG. 3, capacitor 340 has a smaller value than capacitor 350, which in turn has a smaller value than capacitor 370. A modulator represented by circuits 305 and 310 has an increasing capacitance along it length. In many embodiments, an increasing capacitance such as in FIG. 3 may lead to a higher bandwidth and may have a weaker modulation efficiency. As well, turning back to FIG. 1, diodes 120 may also be represented by a set of circuits such as those shown in FIG. 3.

Figure 4:
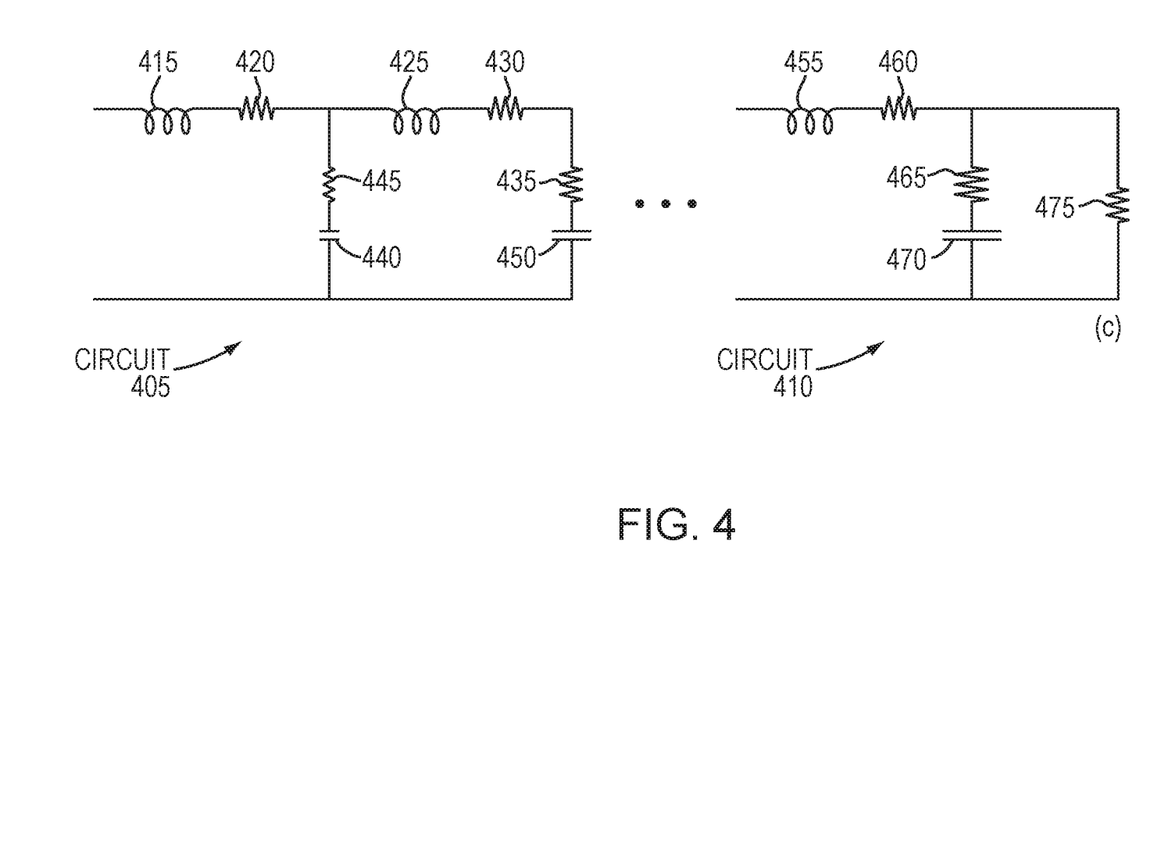
FIG. 4 is a further alternative illustration of a model of a portion of a modulator expressed as a circuit diagram with increasing capacitance and increasing resistance, in accordance with an embodiment of the present disclosure.

Refer now to the example embodiments of FIGS. 1 and 4, where FIG. 4 represents an alternative model of the diodes 110 of modulator 100. In this example embodiment, circuit 405 corresponds to diodes 105 and 107 of Modulator 100 and circuit 410 corresponds to diode 115 of Modulator 100. The ellipse between circuit 405 and 410 represents the other diodes of diodes 110 of modulator 100. In this embodiment, for additional circuits between Circuit 405 and 410 the capacitor in parallel for each additional circuit would have an increasing capacitance between the capacitance of capacitor 450 and capacitor 470. In this embodiment, for additional circuits between Circuit 405 and 410 the resistor in parallel for each additional circuit would have an increasing resistance between the resistance of resistor 445 and resistor 465. Circuit 405 has inductor 415 in series with resistor Rl 420 which is in series with inductor 425 and resistor 430. Capacitor 440 and resistor Rc 445 are in parallel with inductor 415 and with resistor 435 and inductor 450. Circuit 410 has inductor 455 and resistor 460 in parallel with resistor 465 and capacitor 470. Terminal resistor RT 475 corresponds to resistor 140 in modulator 100. In the embodiment of FIG. 4, each of inductors 415, 425, and 455 have the same value.

In the example embodiment of FIG. 4 resistors 440 has a smaller resistance value than resistor 450, which has a smaller resistance value than resistor 465. In the example embodiment of FIG. 4, capacitor 440 has a smaller value than capacitor 450, which in turn has a smaller value than capacitor 470. A modulator represented by circuits 405 and 410 has an increasing capacitance along it length. A modulator represented by circuits 405 and 410 has an increasing resistance along its length. In many embodiments, an increasing capacitance such as in FIG. 4 may lead to a higher bandwidth and may have a weaker modulation efficiency. As well, turning back to FIG. 1, diodes 120 may also be represented by a set of circuits such as those shown in FIG. 4.

Figure 5:
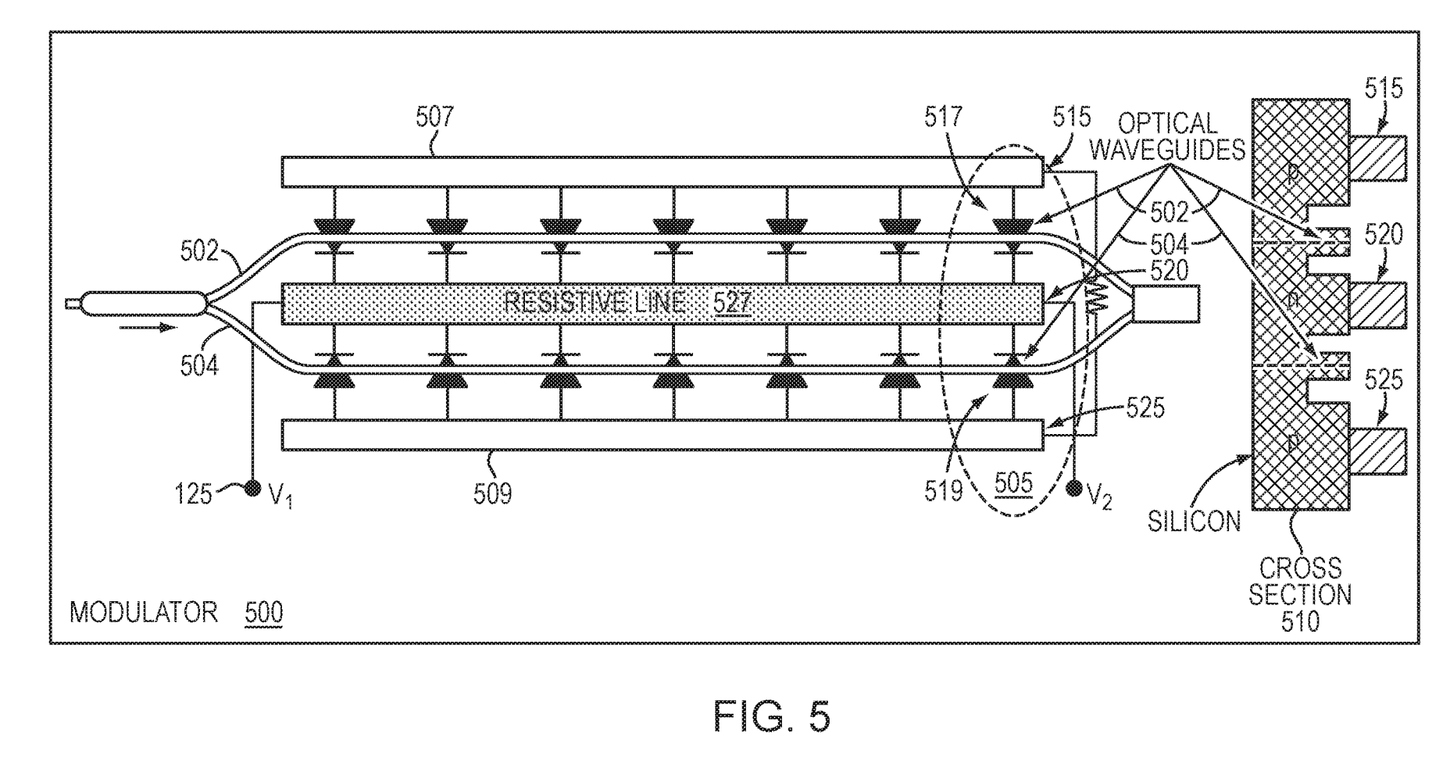
FIG. 5 is a simplified illustration of a model of a modulator and a cross section of a p-n junction with waveguides implementing a portion of the modulator, in accordance with an embodiment of the present disclosure.

Refer now to the example embodiment of FIG. 5, which illustrates a modulator with a waveguides passing through diodes and a corresponding representation of the diodes and waveguide as p-n junctions. Portion 505 of modulator 500 is represented as cross section 510. Cross section 510 illustrates how a modulator may be implemented in silicon. Diodes 517 and 519, as well as resistive line 527 and conductive lines 507 and 509. Waveguides 502 and 504 in modulator 500 are represented as waveguides 502 and 504 in cross section 510. Metal contacts 515, 520, and 525 are present both in portion 505 of modulator 500 and cross section 510. In most embodiments, to implement the full length of modulator 500, cross section 510 would be stretched to the length of the modulator and metal contacts reproduced on the other side of cross section 510, generally as shown in modulator 500.

In many embodiments, given a modulator such as that of cross section 510, there may be different ways to increase bandwidth of the modulator. In a particular embodiment, capacitance C may be increased by increasing the doping in the center of the waveguide and/or changing the modulator bias along the modulator. In other embodiments, a bias voltage may be higher at the beginning of the modulator such as the metal contacts 504 of modulator than at the end of the metal contacts such as that of 525 of modulator 500. In still other embodiments, multiple sections, such as that of cross section 510 may be used to increase doping of a modulator. In certain embodiment, inductance may be increased by increasing the gap between the metal lines such as lines 507 and 509 of modulator 500. In other embodiments, inductance may be increased by increasing the gap between the metal lines such as lines 507 and 509 of modulator 500 by narrowing the width of the metal lines.

Figure 6A:
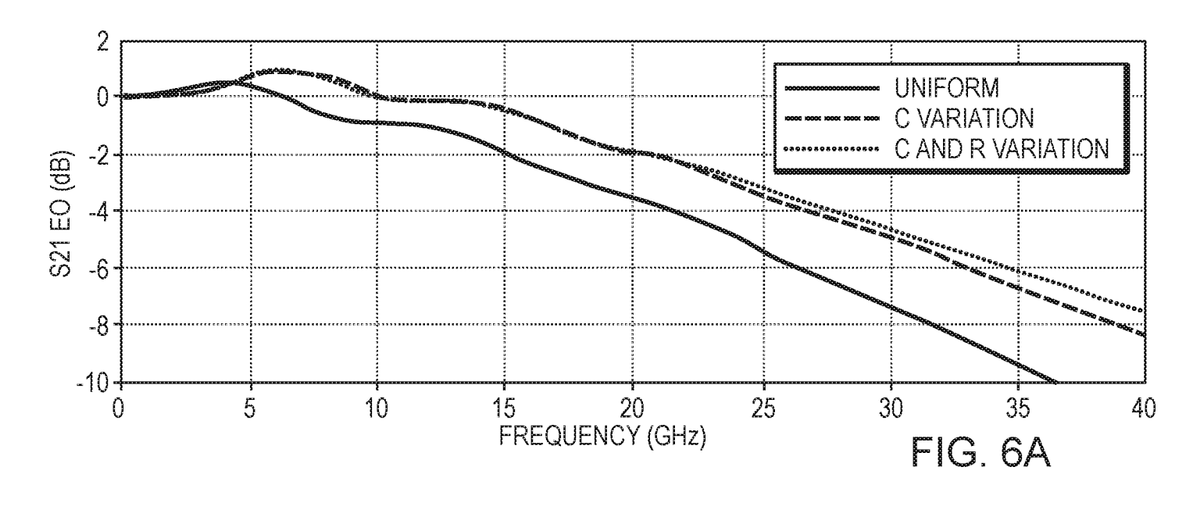
FIG. 6a is a graph illustrating electrical-to-optical response plotted for a modulator with increasing capacitance, in accordance with embodiments of the present disclosure.
Figure 6B:
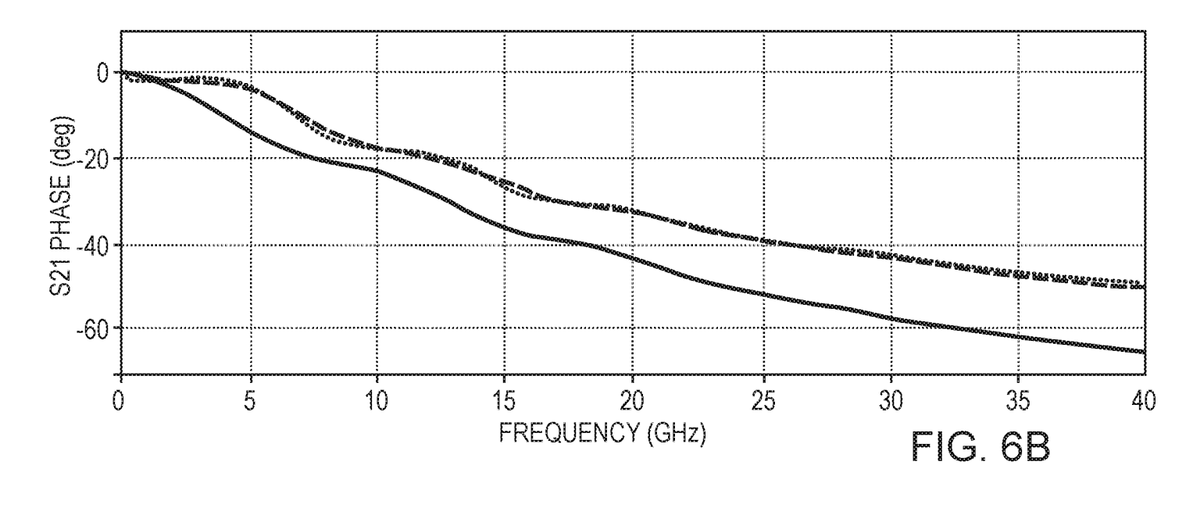
FIG. 6b is a graph illustrating electrical-to-optical response plotted for a modulator with increasing capacitance and resistance, in accordance with embodiments of the present disclosure.

Refer now to the example embodiment of FIG. 6a, which illustrate electrical-to-optical response plotted for a modulator with increasing capacitance. Refer now to the example embodiment of 6a, which illustrates electrical-to-optical response plotted for a modulator with increasing capacitance and resistance.

Figure 7A:
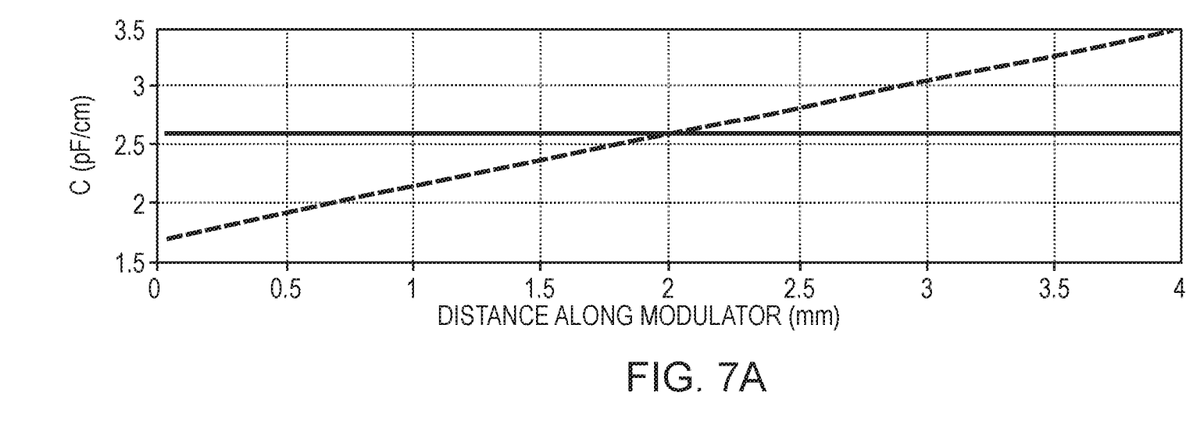
FIGS. 7a and 7b are graphs showing inductance and capacitor series conductance vs. distance along a modulator, in accordance with embodiments of the present disclosure.
Figure 7B:
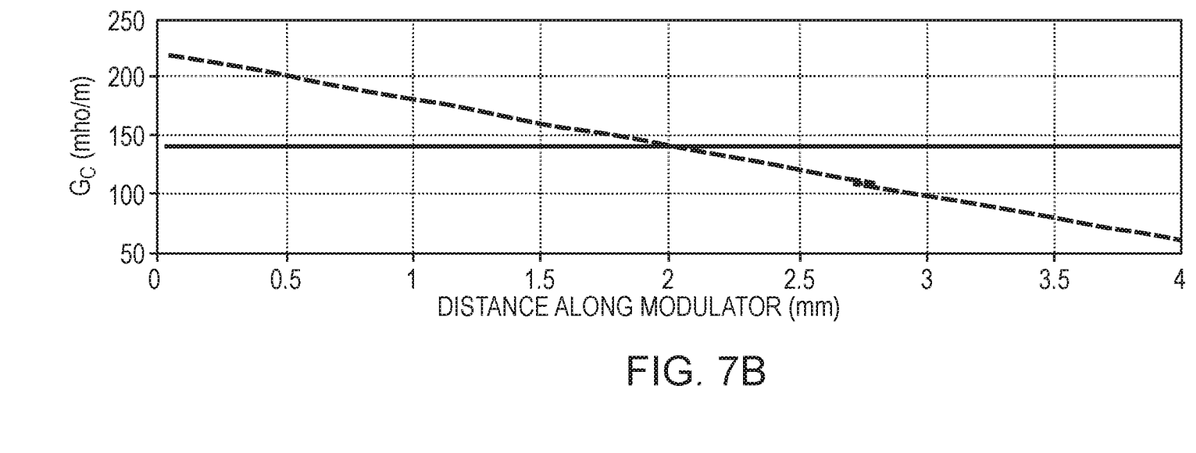

Refer now to the example embodiments of FIGS. 7a and 7b, which illustrate capacitance and conductance (the inverse of resistance RC) along a modulator resulting in an increase of bandwidth. In these example embodiments which illustrate an implementation of FIG. 4, C=2.6 pF/cm, GL=8×10-4 mho/m. The optical group index is 3.9. The termination resistance is 50Ω. The modulator length is 4 mm, and the modulator comprises 100 segments. In these example embodiments, the source is a current source with 350-S2 and a 70-fF capacitor in parallel. In this example, the variation of capacitance C provides a 6-GHz bandwidth improvement, and the variation of resistance RC improves the bandwidth even further at higher frequencies.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

What is claimed is:

1. A method for increasing bandwidth of an optical modulator comprising a waveguide and a resistive line by:
    applying a first bias voltage applied to a beginning of the resistive line; and
    applying a second bias voltage applied to an end of the resistive line; wherein the first voltage is less than the second voltage.

2. The method of claim 1 wherein optical modulator further comprises one or more pn-junctions.

3. The method of claim 2 wherein a capacitance along the one or more pn-junctions increases per unit length along the waveguide.

4. The method of claim 3 wherein a resistance along the one or more pn-junctions increases along the waveguide.

5. The method of claim 3 wherein the change in resistance is caused by a change in doping of the one or more pn junctions.

6. The method of claim 5 wherein the change in resistance is created by locating a doped region of the waveguide closer to the guided optical wave by 0.1 to 1.0 microns.

7. The method of claim 1 wherein the applying of voltage to the resistive line enables modulation of light in the waveguide.

8. An apparatus for optical modulation comprising:
    an optical modulator comprising a waveguide and a resistive line; wherein the resistive line is configured to receive an applied first bias voltage at a beginning of the resistive line; and is further configured to receive a second applied bias voltage to an end of the resistive line; wherein the first voltage is less than the second voltage.

9. The apparatus of claim 8 wherein the optical modulator further comprises one or more pn-junctions.

10. The apparatus of claim 9 wherein a capacitance along the one or more pn-junctions increases per unit length along the waveguide.

11. The apparatus of claim 10 wherein a resistance along the one or more pn-junctions increases along the waveguide.

12. The apparatus of claim 10 wherein the change in resistance is caused by a change in doping of the one or more pn junctions.

13. The apparatus of claim 12 wherein the change in resistance is created by locating a doped region of the waveguide closer to the guided optical wave by 0.1 to 1.0 microns.

14. The apparatus of claim 10 wherein application of voltage to the resistive line enables modulation of light in the waveguide.

* * * * *